3,646,031
2-MORPHOLINO CARBONYL PYRAZINES
Hiroshi Abe, Nishinomiya-shi, Yukio Shigeta, Kobe, Fumihiko Uchimaru, Koganei-shi, Seizaburo Okada, Inbagun, and Akira Kosasayama, Tokyo, Japan, assignors to Daiichi Seiyaku Company, Limited, Tokyo, Japan
No Drawing. Filed Sept. 16, 1968, Ser. No. 762,348
Claims priority, application Japan, Sept. 20, 1967,
42/59,861, 42/59,862
Int. Cl. C07d 87/40
U.S. Cl. 260—247.5 R          3 Claims

ABSTRACT OF THE DISCLOSURE

Novel 2-carbonyl pyrazine derivatives are prepared by reaction of the corresponding pyrazine-2-carboxylic acid derivatives with alkyl alcohol or by reaction of the corresponding ester with an amine, and are useful as oral hypoglycemic agent or as reducing agent of non-esterified fatty acid level.

---

This invention relates to novel 2-carbonyl pyrazine derivatives which have a hypoglycemic effect by oral administration and also an effect reducing non-esterified fatty acid level in serum, and to method for producing such derivatives. Particularly, it relates to the novel compounds represented by the following formula:

$$Y-\underset{(I)}{\underset{N}{\bigcirc}}-COX$$

wherein X is selected from the group consisting of alkoxy, piperidino, morpholino and oxazolidino, and Y is selected from the group consisting of hydrogen and alkoxy, and alkyl groups of said alkoxy have 1 to 5 carbon atoms.

An object of the present invention is to provide novel compounds represented by said formula which exhibit an excellent hypoglycemic effect or an effective reduction of the level of non-esterified fatty acid and triglyceride in serum.

Another object is to provide the manufacturing method of such compounds. The invention has been accomplished from the results of investigations of hypoglycemic properties performed in a series of pyrazine derivatives which have been synthesized within the framework of inventor's search for hypoglycemic drugs.

The hypoglycemic activity of the new compounds synthesized by the inventors was compared with that of several known drugs used in the therapy, and some pyrazine derivatives were found to exhibit a marked hypoglycemic activity. One of pyrazine derivatives, morpholinocarbonylpyrazine, has been used in clinical test, and the inventors found that the said compound exhibited not only hypoglycemic effect, but also reducing activities of the level of non-esterified fatty acid and triglyceride in serum, as shown in Table I.

TABLE I.—THE EFFECT OF REDUCING THE LEVEL OF F.B.S., N.E.F.A. AND TRIGLYCERIDE IN SERUM OF HUMAN DIABETICS

| Compound (Oral administration of 1 capsule containing 100 mg. of—) | Percent of reducing effect against value before administration (average of 7 diabetic patients) | | |
|---|---|---|---|
| | 1 hr. after administration | 2 hrs. after administration | 3 hrs. after administration |
| Morpholinocarbonylpyrazine | | | |
| F.B.S.[1] | 96.7 | 88.3 | 80.5 |
| N.E.F.A.[2] | 45.1 | 48.3 | 57.6 |
| Triglyceride | 96 | 95 | 79 |

[1] F.B.S. Fasting blood sugar.
[2] N.E.F.A. Non-esterified fatty acid.

Above clinical data listed in Table I were obtained in accordance with the following details.

One capsule containing 100 mg. of morpholinocarbonylpyrazine was given under fasting condition to each of seven diabetic patients (4 adult men and 3 adult women; body weight from 45 kg. to 65 kg.) who had been treated at Osaka University Hospital and had the value of not less than 40 mg./dl. of F.B.S. The value of F.B.S. was measured by auto-analyzer-method (Technicon), N.E.F.A. in serum by Novak-method, and triglyceride in serum by Van Handel and Zilversmit-method.

Examples of a rat experiment using novel compounds which reduce the fasting blood sugar are shown in Table II.

TABLE II.—THE EFFECT OF REDUCING F.B.S. ON NORMAL AND ALLOXAN DIABETIC RAT

| Compound (each compound was administrated 5 mg./kg. intraperitoneally | Normal or alloxan diabetic | Average percent of reducing effect against value before administration | | | |
|---|---|---|---|---|---|
| | | 1 hr. after | 2 hrs. after | 3 hrs. after | 4 hrs. after |
| Morpholinocarbonyl pyrazine. | Normal | 103 | 86 | 90 | 78 |
| | Alloxan | 88 | 71 | 61 | 59 |
| Methyl-6-methoxy pyrazine-2-carboxylate. | Normal | 78 | 69 | 68 | 70 |
| 6-methoxy-2-morpholino-carbonylpyrazine. | Normal | 94 | 87 | 78 | 71 |

The acute toxicity of said compounds was determined on mouse receiving the compounds by oral and intraperitoneal, as shown in Table III.

TABLE III.—ACUTE TOXICITY TEST OF NOVEL COMPOUNDS ON MOUSE

| Compound | $LD_{50}$ (g./kg.) oral | $LD_{50}$ (g./kg.) intraperitoneal |
|---|---|---|
| Morpholinocarbonylpyrazine | 5.95–8.33 | |
| Methyl-6-methoxy-pyrazine-2-carboxylate | >2.5 | >1.3 |
| 6-methoxyl-2-morpholino carbonyl-pyrazine | >2.5 | >0.5 |

These novel compounds formulated (I) can be prepared in accordance with the process of present invention represented by the following reaction schema;

$$Y-\underset{(II)}{\underset{N}{\bigcirc}}-COOH \xrightarrow{ROH} Y-\underset{(III)}{\underset{N}{\bigcirc}}-COOR \xrightarrow{amine} Y-\underset{(I)}{\underset{N}{\bigcirc}}-COX$$

wherein X and Y are defined as previously and R represents $C_1$–$C_5$ alkyl radical.

According to above described process pharmacologically active compound formulated (I) or (III) are prepared from a corresponding pyrazine 2-carboxylic acid derivative as starting material. The first esterification reaction to obtain the compound formulated (III) is carried out by refluxing a corresponding starting material with $C_1$–$C_5$ alkyl alcohol in the presence of a catalyst such as hydrochloric acid, sulfuric acid or thionyl chloride.

The amidation producing the compound formulated (I) is carried out by treating a corresponding ester (III) with a small excess of corresponding amine such as piperidine, morpholine or oxazolidino in usual manner.

The starting material in this process includes a novel 6-methoxypyrazine-2-carboxylic acid and it is easily prepared by the reaction of sodium methoxide with 6-chloropyrazine-2-carboxylic acid prepared from pyrazine-2-carboxylic acid-4-oxide.

Those compounds thus obtained will be of great use in treatment for hyperglycemia, hyperlipemia, atherosclerasis, myocardial infarction and nephrosis.

The present invention will be explained more fully by the following specific examples.

EXAMPLE 1

The suspension of pyrazinecarboxylic acid (16 g.) in 22% methanolic HCl solution (100 ml.) was refluxed on a steam bath for 1 hour. After removal of the solvent the residue was dissolved in $H_2O$ (40 ml.), chilled, and the pH of the solution was adjusted to about 5.4 by sodium hydrogen carbonate. Sodium chloride was then added and the solution was extracted with ether (2× 800 ml.). The ether layer was dried, concentrated in vacuo to dryness to leave a solid, which was dissolved in ether (200 ml.), and filtered to remove the small amount of impurity. Evaporation of the solvent afforded needles (9 g.), M.P. 58° C. It is recrystallized from ether to give needles of methyl pyrazinecarboxylate melting at 58.5°–60.5° C.

EXAMPLE 2

A solution of methyl pyrazinecarboxylate (13.8 g.) in dry morpholine (17.4 ml.) was refluxed for 30 minutes. After evaporation of the excess morpholine in vacuo the darkbrown oily residue was purified with silicagel chromatography eluating with chloroform. The residue obtained from the eluate was distilled under reduced pressure to give morpholinocarbonylpyrazine (17.4 g.) as faint yellow liquid; B.P. 0.02/mm. Hg 125°–129° C., UV $\lambda_{max.}^{MeOH}$ m$\mu$ (log $\epsilon$); 270 (3.85).

IR $\nu_{max.}^{liq\,film}$ cm$^{-1}$: 1642–1631

Thin layer chromatography, (EtOH: $CHCl_3$ 1:1), $R_f$ 0.62.

*Analysis.*—Calcd. for $C_9H_{11}N_3O_2$ (percent): C, 55.95; H, 5.74; N, 21.75. Found (percent): C, 55.13; H, 5.59; N, 21.32.

2 - morpholinocarbonyl - 4 - methylpyrazinium iodide, M.P. 196–197 (d.), was obtained from morpholinocarbonylpyrazine and methyl iodide.

*Analysis.* Calcd. for $C_{10}H_{14}N_3O_2I$ (percent): C, 35.83; H, 4.21; N, 12.54. Found (percent): C, 36.01; H, 4.06; N, 12.49.

EXAMPLE 3

The reaction was carried out exactly the same as above, in the scale of methyl pyrazinecarboxylate (13.8 g.) and morpholine (17.4 ml.).

The dark-brown oily residue was dissolved in chloroform (1 l.) and the solution was washed with three portions of a 2% sodium hydrogen carbonate solution (each 80 ml.) which was saturated with sodium chloride. The liquid obtained from the chloroform solution was dissolved in water (800 ml.), and the solution was washed with ether (150 ml.) decolorized with active charcoal (3.2 g.), filtered, and concentrated in vacuo to dryness affording a liquid. This material was distilled under reduced pressure to give morpholinocarbonylpyrazine (5 g.) as colorless liquid, B.P. 0.02/mm. Hg 123° C.

EXAMPLE 4

To morpholine (0.907 g.) methyl 6-methoxypyrazine-2-carboxylate (0.35 g.) was added and the solution was refluxed for 30 minutes. After evaporation of the excess morpholine in vacuo (below 60° C.) the dark-brown residue was dissolved in chloroform and the solution was decolorized with active charcoal, evaporated to dryness in vacuo giving 470 mg. of crude product. It was dissolved in chloroform and chromatographed on a silicagel column.

Elution with chloroform furnished 254 mg. of 6-methoxy-2-morpholinocarbonylpyrazine. Recrystallization from isopropyl alcohol forms colorles prisms melting at 109°–110.5° C.

UV $\lambda_{max.}^{MeOH}$ m$\mu$ (log $\epsilon$): 219.3 (4.04), 290.8 (382).

IR $\nu_{max.}^{KBr}$ cm.$^{-1}$: 3035, 1581, 1535, 1638

Thin layer chromatography ($C_6H_6$:EtOH 9:1), $R_f$ 0.47. Gas liquid chromatography (1% Xe-60, 180° C.) Rt 11.20 min. NMR ($\tau$) ($CDCl_3$) 1.58 (1 H), 1.75 (1 H), 6.05 (3 H).

*Analysis.* Calcd. for $C_{10}H_{13}N_3O_3$ (percent): C, 53.80; H, 5.87; N, 18.83. Found (percent): C, 54.30; H, 5.86; N, 18.48.

EXAMPLE 5

To phosphoryl chloride (18.5 ml.) 2-pyrazinecarboxylic acid-4-oxide (2.5 g.) was added and the suspension was gradually heated with stirring until exothermic reaction, which occurs at about 50° C., subsided. The solution was refluxed for further 15 minutes and two-thirds of the solution was removed in vacuo. The dark mixture was cooled and poured continuously on chopped ice with vigorous stirring and the solution was allowed to stand at room temperature over night. The product was isolated by extraction with chloroform. The extract was washed with a small portion of water and dried over sodium sulfate. Evaporation of the solvent and recrystallization of the residue (1.5 g.) from water afforded a pure sample of 6 - chloro-pyrazine-2-carboxylic acid melting at 154°–155° C.

*Analysis.* Calcd. for $C_5H_3ClN_2O_2$ (percent): C, 37.81; H, 1.90; N, 17.66; Cl, 22.36. Found (percent): C, 38.09; H, 2.40; N, 17.70; Cl, 22.04.

EXAMPLE 6

6-chloro-pyrazine-2-carboxylic acid (0.872 g.) was dissolved in absolute methanol (10 ml.) and the solution was added portionwise to the stirred sodium methoxide solution made from sodium (0.375 g.) and absolute methanol (10 ml.). The mixture was stirred and refluxed for 3 hours. Most of the solvent was evaporated and the residue was dissolved in a small amount of water. The aqueous solution was neutralized with 10% hydrochloric acid solution and concentrated until crystals had precipitated. The resulting mixture was chilled and the precipitate was collected, washed with small amount of cold water. The yield of 6-methoxyprazine-2-carboxylic acid was 0.67 g., M. P. 175°–177.5° C. Recrystallization from water forms colorless needles melting at 176°–177.5° C.

UV $\lambda_{max.}^{MeOH}$ m$\mu$ (log $\epsilon$): 223.8 (3.66), 289.6 (4.21)

IR $\nu_{max.}^{KBr}$ cm.$^{-1}$: 2900–2400, 1725, 1590, 1545

*Analysis.*—Calcd. for $C_6H_6N_2O_3$: (percent): C, 47.76; H, 3.92; N, 18.18. Found (percent): C, 47.62; H, 3.95; N, 17.87.

EXAMPLE 7

The suspension of 6-methoxypyrazine-2-carboxylic acid (0.4 g.) in 15% methanolic hydrochloric acid solution (5 ml.) was refluxed on a steam bath for 40 minutes. After evaporation of the solvent the residue was dissolved in a small amount of water. Sodium chloride was then added to the solution and it was extracted with chloroform. The chloroform solution was dried, evaporated in vacuo to leave crude product (0.427 g.) which was recrystallized from petroleum ether to afford pure methyl 6-methoxypyrazine-2-carboxylate melting at 72°–73.5° C.

UV $\lambda_{max.}^{H2O}$ m$\mu$ (log $\epsilon$): 226 (3.86), 296 (3.86)

IR $\nu_{max.}^{KBr}$ cm.$^{-1}$: 1584, 1544, 1722

Thin layer chromatography ($CHCl_3$: EtOH 9:1), $R_f$ 0.62. NMR ($\tau$) ($CDCl_3$): 1.33 (1 H), 1.65 (1 H), 5.93 (3 H), 5.98 (3 H).

*Analysis.*—Calcd. for $C_7H_8N_2O_3$ (percent): C, 49.98; H, 4.80; N, 16.63. Found (percent): C, 50.19; H, 4.81; N, 16.67.

What we claim is:

1. A compound of the formula:

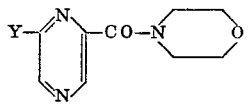

wherein Y is selected from the group consisting of hydrogen and alkoxy having 1 to 5 carbon atoms.

2. Morpholinocarbonylpyrazine.
3. 6-methoxy-2-morpholinocarbonylpyrazine.

References Cited

UNITED STATES PATENTS 3,452,014  6/1969  Wright et al. _____ 260—250

OTHER REFERENCES

Coté et al. Chemical Abstracts, vol. 46, p. 9714d (1952).

ALEX MAZEL, Primary Examiner

J. TOVAR, Assistant Examiner

U.S. Cl. X.R.

260—250 R; 424—248